US012470475B2

(12) United States Patent
Theobald et al.

(10) Patent No.: US 12,470,475 B2
(45) Date of Patent: Nov. 11, 2025

(54) METHOD AND SYSTEMS FOR ETHERNET VIRTUAL PRIVATE NETWORKS FAST RE-ROUTE CONVERGENCE

(71) Applicant: Cisco Technology, Inc., San Jose, CA (US)

(72) Inventors: Brandon D Theobald, Ottawa (CA); Patrice Brissette, Gatineau (CA); Mike RE Mallin, Gatineau (CA); Luc Andre Burdet, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 18/146,350

(22) Filed: Dec. 23, 2022

(65) Prior Publication Data

US 2024/0214303 A1 Jun. 27, 2024

(51) Int. Cl.
*H04L 45/00* (2022.01)
*H04W 40/02* (2009.01)

(52) U.S. Cl.
CPC .............. *H04L 45/22* (2013.01); *H04L 45/66* (2013.01); *H04W 40/02* (2013.01)

(58) Field of Classification Search
None
See application file for complete search history.

(56) References Cited

U.S. PATENT DOCUMENTS

| 10,212,075 | B1* | 2/2019 | Lakshmikanthan ........................ H04L 12/4641 |
| 12,355,660 | B2* | 7/2025 | He .......................... H04L 45/50 |
| 2021/0211372 | A1* | 7/2021 | Lin .......................... H04L 45/28 |
| 2022/0247669 | A1 | 8/2022 | Burdet et al. |
| 2022/0272027 | A1 | 8/2022 | Lin et al. |

FOREIGN PATENT DOCUMENTS

WO 2021260423 12/2021

OTHER PUBLICATIONS

Burdet et al., "EVPN Fast Reroute," BESS Working Group, Oct. 23, 2022, pp. 1-16.

* cited by examiner

*Primary Examiner* — Xavier S Wong
(74) *Attorney, Agent, or Firm* — Polsinelli P.C.

(57) ABSTRACT

Disclosed herein are systems, methods, and computer-readable media for forwarding data in response to a detected local area network failure. In one aspect, a method includes identifying one or more EVPN services in a local area network. In one aspect, the method includes allocating one or more FRR labels, each of the FRR labels corresponding to each of the EVPN services. In one aspect, the method includes broadcasting the FRR labels to a plurality of network appliances of the LAN. In one aspect, the method includes determining one or more EVI-EAD routes associated with the FRR labels. In one aspect, the method includes detecting a LAN failure of one of the plurality of the network appliances. In one aspect, the method includes forwarding incoming data to another one of the plurality of the network appliances in accordance with the determined EVI-EAD routes, in response to detecting the LAN failure.

20 Claims, 16 Drawing Sheets

METHOD AND SYSTEMS FOR ETHERNET VIRTUAL PRIVATE NETWORKS FAST RE-ROUTE CONVERGENCE

TECHNICAL FIELD

The subject matter of this disclosure generally relates to the field of computer networking, and more particularly, to fast re-route convergence for ethernet private networks (EVPN).

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Current mobile and wireless communication systems have widely adopted a next-generation wireless communication system, 5G that provides much higher data rates and lower latency. With the 5G evolution, a concept known as Private 5G (P5G) has been introduced. P5G uses 5G-enabled technologies (e.g., 3GPP access), but allows the owner to provide priority access or licensing for its wireless spectrum or dedicated bandwidth.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary examples of the disclosure and are not therefore to be considered to be limiting of its scope, the principles herein are described and explained with additional specificity and detail through the use of the accompanying drawings in which.

DETAILED DESCRIPTION

Figure 1A:
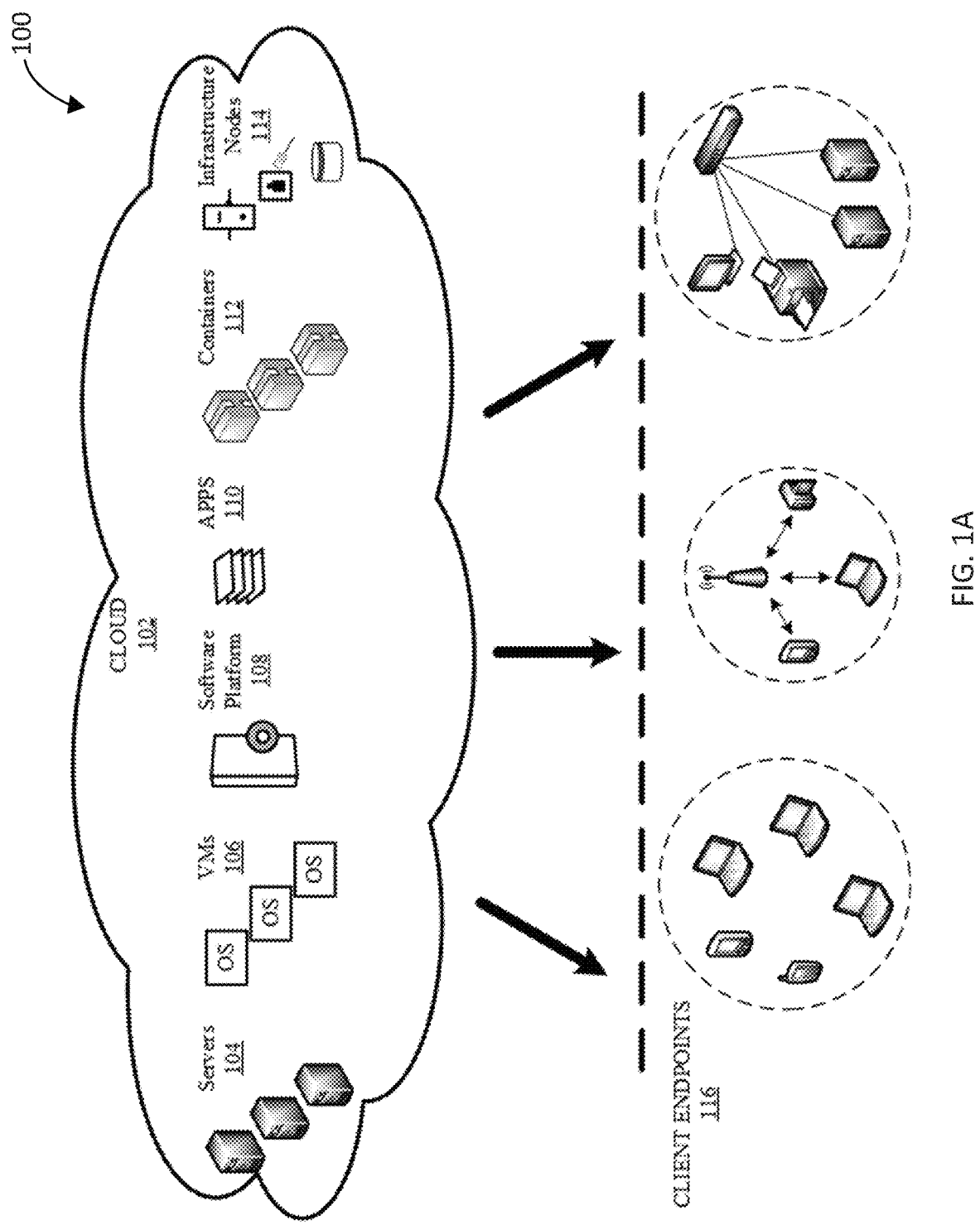
FIG. 1A illustrates an example cloud computing architecture in accordance with some aspects of the disclosed technology.

Various examples of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which can be exhibited by some examples and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various examples given in this specification.

Without intent to limit the scope of the disclosure, examples of instruments, apparatus, methods and their related results according to the examples of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present disclosure is directed towards techniques for EVPN fast re-route (FRR) convergence. The disclosure further discusses the allocation, distribution, and disposition programming of the FRR label matches the existing FRR functionality used on the multi-homed peer PE devices.

In one aspect, a method for the forwarding of data in response to a detected local area network (LAN) failure. The method includes identifying one or more EVPN services in a local area network (LAN). The method includes allocating one or more FRR labels. Each of the FRR labels corresponds to one or more functions of the EVPN services. The method includes broadcasting the FRR labels to a plurality of network appliances of the LAN. The method includes determining one or more EVPN instances (EVI)-ethernet auto discovery route (EAD) (EVI-EAD) routes associated with the FRR labels. The method includes detecting a LAN failure of one of the plurality of the network appliances. The method includes forwarding incoming data to another one of the plurality of the network appliances in accordance with the determined EVI-EAD routes.

In another aspect, the method further includes programming a primary EVI-EAD route for forwarding the incoming data to the one or more network appliances. The primary EVI-EAD route comprises an EVPN service comprising a service label including at least one of the one or more EVI-EAD routes.

In another aspect, programming a backup EVI-EAD route for forwarding the incoming data to one of the plurality of network appliances. The backup route comprises an EVPN service comprising an updated FRR label including a next EVPN service to forward the incoming data.

In another aspect, the method further includes replacing a primary EVI-EAD route for forwarding the incoming data with the backup EVI-EAD route.

In another aspect, each of the FRR labels is configured with one or more attributes comprising a primary layer-2 (L2) attribute and a backup L2 attribute signaled with the determined EVI-EAD routes.

In another aspect, the method further includes receiving a designated forwarder (DF) election indicating one or more EVPN services configured to receive the incoming data upon detection of the LAN failure. The method includes bypassing the one or more EVPN services comprising the DF election. The method includes forwarding the incoming data to the one or more EVPN services comprising the FRR label.

In another aspect, the FRR labels are broadcast to network appliances and EVPN services currently routing traffic along at least one of the EVI-EAD routes.

In one aspect, a network device comprises a transceiver, and a processor configured to execute instructions. The processor can identify one or more ethernet virtual private networks EVPN services in a LAN. The processor can allocate one or more FRR labels. Each of the FRR labels corresponds to one or more functions of the EVPN services. The processor can broadcast the FRR labels to a plurality of network appliances of the LAN. The processor can determine one or more EVI-EAD routes associated with the FRR labels. The processor can detect a LAN failure of one of the plurality of the network appliances. The processor can forward incoming data to another one of the plurality of the network appliances in accordance with the determined EVI-EAD routes.

In one aspect, one or more non-transitory computer-readable media include computer-readable instructions, which when executed by a computing system, causes the computing system to identify one or more EVPN services in a LAN. The computing system can allocate one or more FRR labels. Each of the FRR labels corresponds to one or more functions of the EVPN services. The computing system can broadcast the FRR labels to a plurality of network appliances of the LAN. The computing system can determine one or more EVI-EAD routes associated with the FRR labels. The computing system can detect a LAN failure of one of the plurality of the network appliances. The computing system can forward incoming data to another one of the plurality of the network appliances in accordance with the determined EVI-EAD routes.

DESCRIPTION OF EXAMPLE EMBODIMENTS

Enterprise networks require high availability, particularly in instances when private 5G solutions are offered. For instance, the use cases require greater than 99.99% availability including the ability to connect new devices. This is particularly noteworthy for industrial automation applications but in general applicable to various private 5G deployments.

In a typical EVPN convergence system, there is a reliance on the Border Gateway Protocol (BGP) control plane to distribute routes and inform remote PE devices of local failures. Additionally, EVPN convergence systems further include single-active load balancing, which manages the speed at which hardware can program the designated forwarder (DF) or non-designated forwarder (NDF) state of a local attachment circuit during data transfer. For example, when a provider edge (PE) node device learns that it must switch from NDF to DF, performing bring-up and binding of hardware resources can be slow at scale. In that time, egress traffic received from a remote PE device is at risk of being dropped.

Through the implementation of an L2 FRR (L2FRR) disposition path, faster traffic convergence can be achieved after an access network failure is detected. An FRR label can be distributed among multi-homed peers and used to create a disposition path that can bypass designated forwarder (DF) election results. In accordance, in-flight traffic is re-routed to a peer PE router instead of being dropped while control plane programming occurs. This pre-programmed re-route circuit is known as a L2 Loop-Free Alternate (2LFA). The implementation of this technology bypasses DF elections to mimic BGP Prefix-Independent Convergence (PIC) (BGP PIC) edge functionality for fast convergence. However, this can only be used to re-route in-flight traffic between multi-homed peers during a failure.

Accordingly, the disclosed technology addresses the need in the art for an extension of the scope of the FRR label to remote nodes, to allow EVPN forwarding to continue with minimal interruption during both an access failure and during recovery. Further needs are addressed relating to techniques to implement L2FRR functionality on lower cost platforms that can have fewer resources available for L2 features.

Figure 1B:
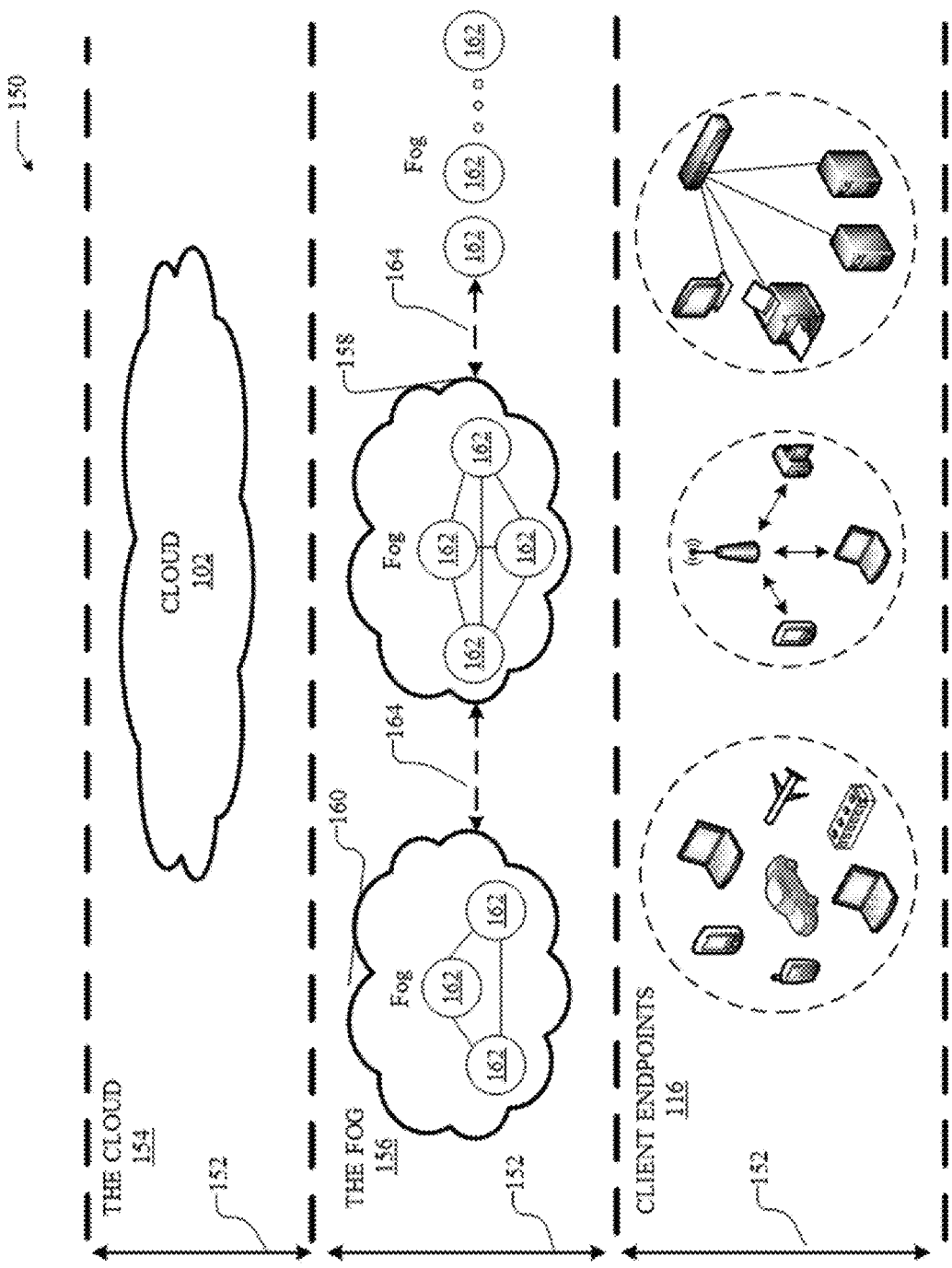
FIG. 1B illustrates an example fog computing architecture in accordance with some aspects of the disclosed technology.
Figure 2:
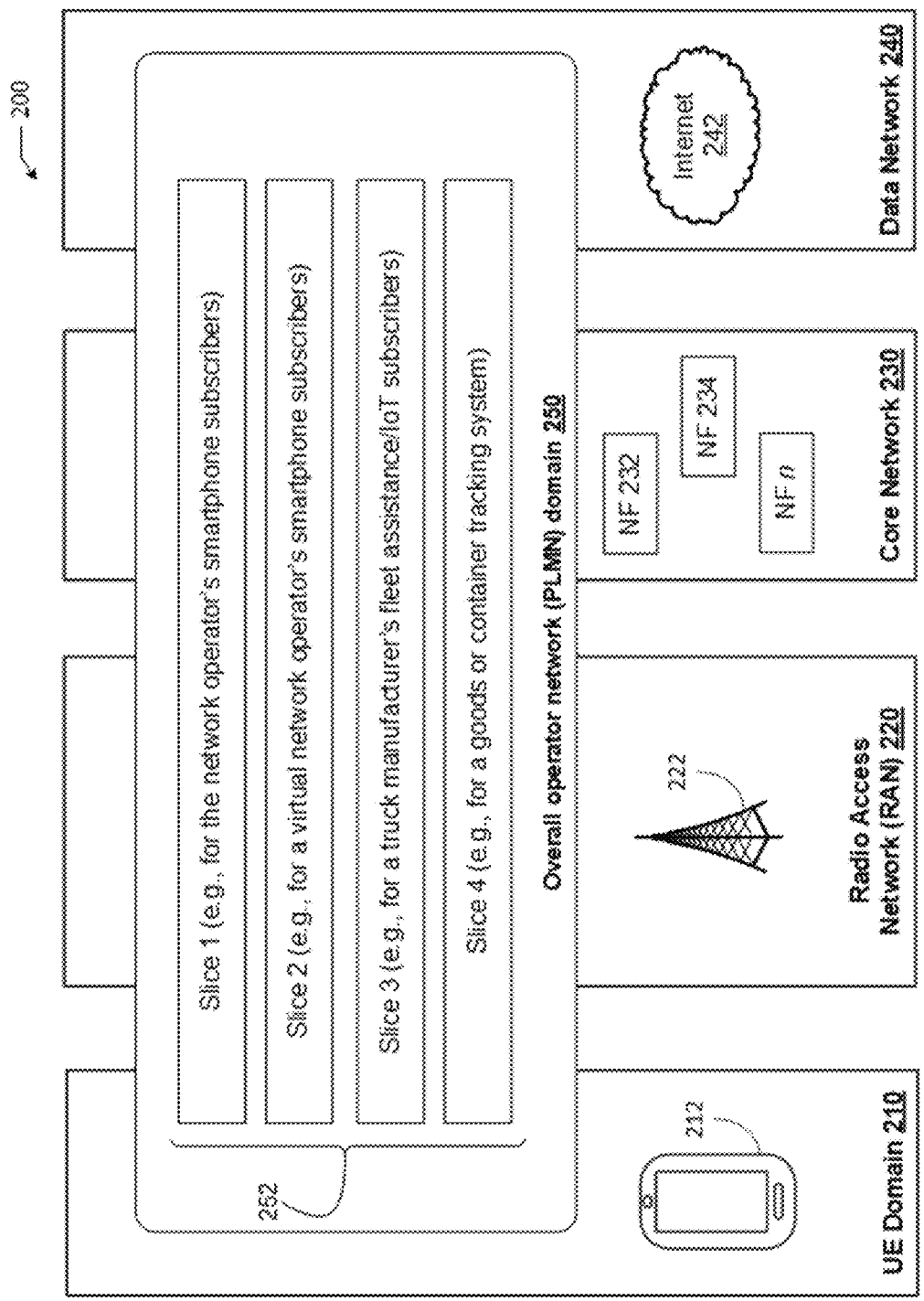
FIG. 2 depicts an example schematic representation of a 5G network environment in which network slicing has been implemented in accordance with some aspects of the disclosed technology.
Figure 13:
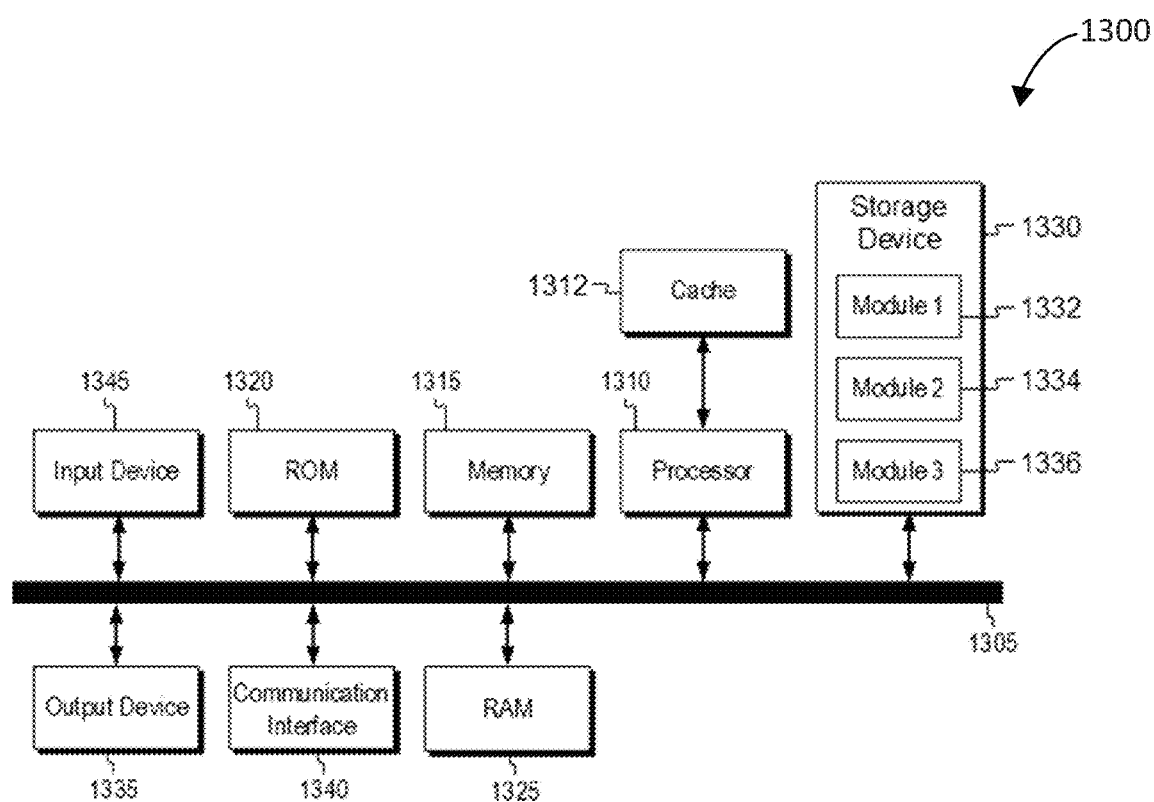
FIG. 13 shows an example of computing system 1300, which can be for example any computing device that can implement components of the system.
Figure 14:
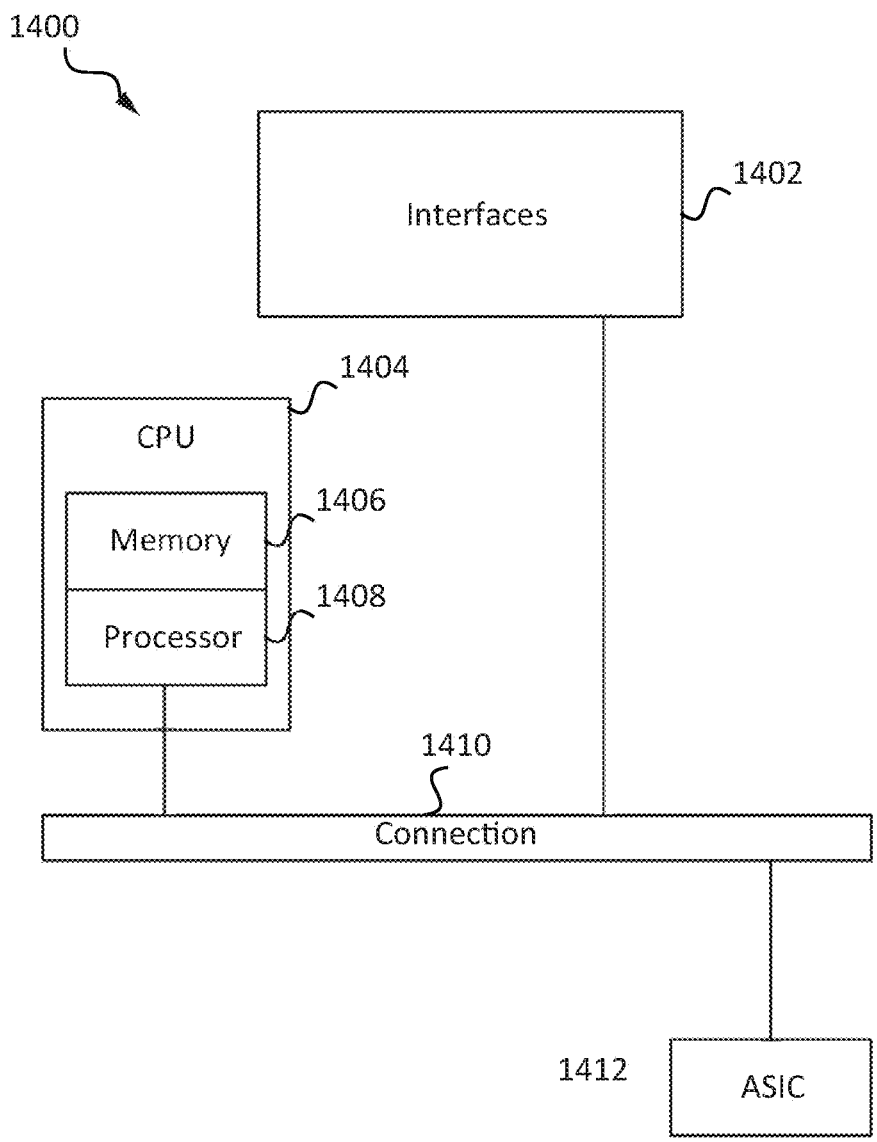
FIG. 14 illustrates an example network device in accordance with some examples of the disclosure.

A description of network environments and architectures for network data access and services, as illustrated in FIG. 1A, FIG. 1B, and 2 is first disclosed herein. A discussion of systems, methods, and computer-readable medium for federating enterprises and SaaS providers using network slices, as shown in FIG. 2, will then follow. The discussion then concludes with a brief description of example devices, as illustrated in FIG. 13 and FIG. 14. These variations shall be described herein as the various examples are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (in at least one example collaboration services, email services, enterprise resource planning services, content services, communication services, etc.), infrastructure as a service (IaaS) (in at least one example, security services, networking services, systems management services, etc.), platform as a service (PaaS) (in at least one example, web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (in at least one example, Internet), private networks, and/or hybrid networks (in at least one example, virtual private network). The client endpoints 116 can include any device with networking capabilities, such as a laptop computer, a tablet computer, a server, a desktop computer, a smartphone, a network device (in at least one example, an access point, a router, a switch, etc.), a smart television, a smart car, a sensor, a GPS device, a game system, a smart wearable object (in at least one example, smartwatch, etc.), a consumer object (in at least one example, Internet refrigerator, smart lighting system, etc.), a city or transportation system (in at least one example, traffic control, toll collection system, etc.), an internet of things (IoT) device, a camera, a network printer, a transportation system (in at least one example, airplane, train, motorcycle, boat, etc.), or any smart or connected object (in at least one example, smart home, smart building, smart retail, smart glasses, etc.), and other devices that are capable of being part of a network.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (in at least one example, via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including for example, star, ring, mesh or hierarchical arrangements.

In some cases, one or more fog nodes 162 can be mobile fog nodes. The mobile fog nodes can move to different geographic locations, logical locations, logical networks, and/or fog instances while maintaining connectivity with the cloud layer 154 and/or the endpoints 116. For example, a particular fog node can be placed in a vehicle, for example, an automobile, an aircraft and/or train, which can travel from one geographic location and/or logical location to a different geographic location and/or logical location. In this example, the particular fog node can connect to a particular physical and/or logical connection point with the cloud 154 while located at the starting location and switch to a different physical and/or logical connection point with the cloud 154 while located at the destination location. The particular fog node can thus move within particular clouds and/or fog instances and serve endpoints from different locations at different times.

FIG. 2 depicts an exemplary schematic representation of a 5G network environment 200 in which network slicing has been implemented, and in which one or more aspects of the present disclosure can operate. As illustrated, network environment 200 is divided into four domains, each of which will be explained in greater depth below; a User Equipment (UE) domain 210, in at least one example of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, in at least one example to users in the UE domain 210.

Core Network 230 contains a plurality of Network Functions (NFs), shown here as NF 232, NF 234 . . . NF n. In some examples, core network 230 is a 5G core network (5GC) in accordance with one or more accepted 5GC architectures or designs. In some examples, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some examples, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some examples, an AMF/MME can be common to or otherwise shared by multiple slices of the plurality of network slices 252, and in some examples an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some examples a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing can span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. Network slicing permits for the controlled composition of a PLMN with the specific network functions and provided services that are required for a specific usage scenario. Network slicing enables a 5G network operator to deploy multiple, independent PLMNs where each is customized by instantiating only those features, capabilities and services required to satisfy a given subset of the UEs or a related business customer needs.

Network slicing can play a critical role in 5G networks because of the multitude of use cases and new services 5G is capable of supporting. Network service provisioning through network slices can be initiated when an enterprise requests network slices when registering with AMF/MME for a 5G network. At the time of registration, the enterprise can ask the AMF/MME for characteristics of network slices, such as slice bandwidth, slice latency, processing power, and slice resiliency associated with the network slices. Network slice characteristics can be used in ensuring that assigned network slices are capable of actually provisioning specific services, in at least one example based on requirements of the services, to the enterprise.

Associating SaaSs and SaaS providers with network slices used to provide the SaaSs to enterprises can facilitate efficient management of SaaS provisioning to the enterprises. An enterprise/subscriber to associate already procured SaaSs and SaaS providers with network slices actually being used to provision the SaaSs to the enterprise. Associating SaaSs and SaaS providers with network slices can require federation across enterprises, network service providers, in at least one example 5G service providers, and SaaS providers.

In accordance with some examples and examples discussed in further detail below, the disclosed technology provides for the allocation, distribution, and disposition programming of an FRR label. The FRR label can match an existing FRR functionality that is used on a plurality of multi-homed peer PE devices.

Figure 3:
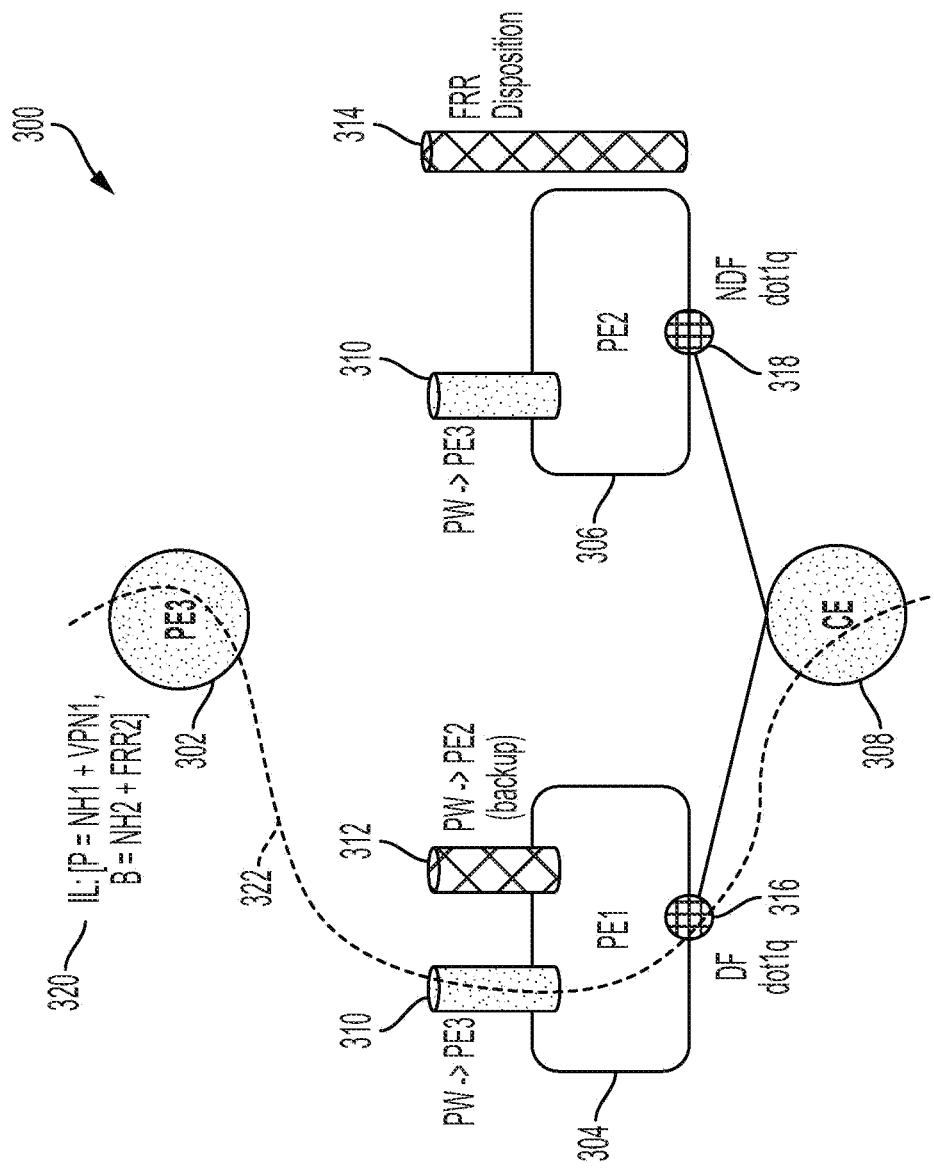
FIG. 3 illustrates a steady state single-active EVPN topology in accordance with some aspects of the disclosed technology.

FIG. 3 illustrates a steady state single-active EVPN topology 300 in accordance with some aspects of the disclosed technology. The topology 300 can include multiple PEs in PE1 304 and PE2 306. The PEs 304, 306 can be router or additional network device that is configured as a network entry point, allowing additional devices to communicate with the network. In FIG. 3, PE1 304 and PE2 306, each of which can be dual homed peers using single-active load balancing, can be programmed with one or more EVPN services by a remote node PE3 302. Each EVPN service at PE1 304 and PE2 306 can be allocated and programmed by PE3, with an FRR label. For example, as shown in FIG. 3, PE1 304 is allocated and programmed with a PE3 label 310 as a primary EVI route for the data traffic through PE1 304. PE3 302 be in designated as the primary EVI route allows PE3 and PE1 to be connected via a pseudowire (PW) connection, that allows for data traffic to be routed between the remote node PE3 302 and the EVPN service programmed at PE1 304. Further, PE1 304 can be configured as the DF node 316, that forwards the traffic to the CE 308. PE1 304 being configured to forward the traffic as the DF node 316, can signal a bit representing the EVI route the data traffic is being forwarded through, as the primary route. While PE1 304 is configured as the DF node 316, PE2 306 is configured as the NDF node 318, and signals a new FRR label, the PE2 label 312. The PE2 label can be used to program PE1 to use the EVPN service programmed at PE2 306 as the backup EVPN service associated with a backup EVI route. Accordingly, the PE2 label 312 can be distributed, by being advertised to additional nodes such as PE1 304, in order to program the FRR label for PE2 306 as the backup EVPN service, along with a corresponding backup EVI route. PE2 further includes an FRR Disposition 314 that includes a disposition path to forward egress traffic that contains a programmed FRR label for PE2 306, resulting in the bypassing the result of the NDF election on PE2.

In some examples, the new FRR label functionality, as shown by the PE2 label 312 programmed at PE1 by PE3, can be used for EVPN, particularly for single-active. The PE2 label 312 programmed as the backup EVI route, is representative of the internal label (IL) 320. The implementation of the new FRR label allows for the leveraging of the primary and backup L2 attributes, signaled by the PE1 304 and PE2 306 respectively, with the EVI/EAD routes used to program the remote IL 320. Accordingly, for backup routes, instead of programming the typical VPN label, the FRR label can be programmed so ingress traffic being forwarded to the backup node can encapsulate the appropriate FRR label.

Figure 4A:
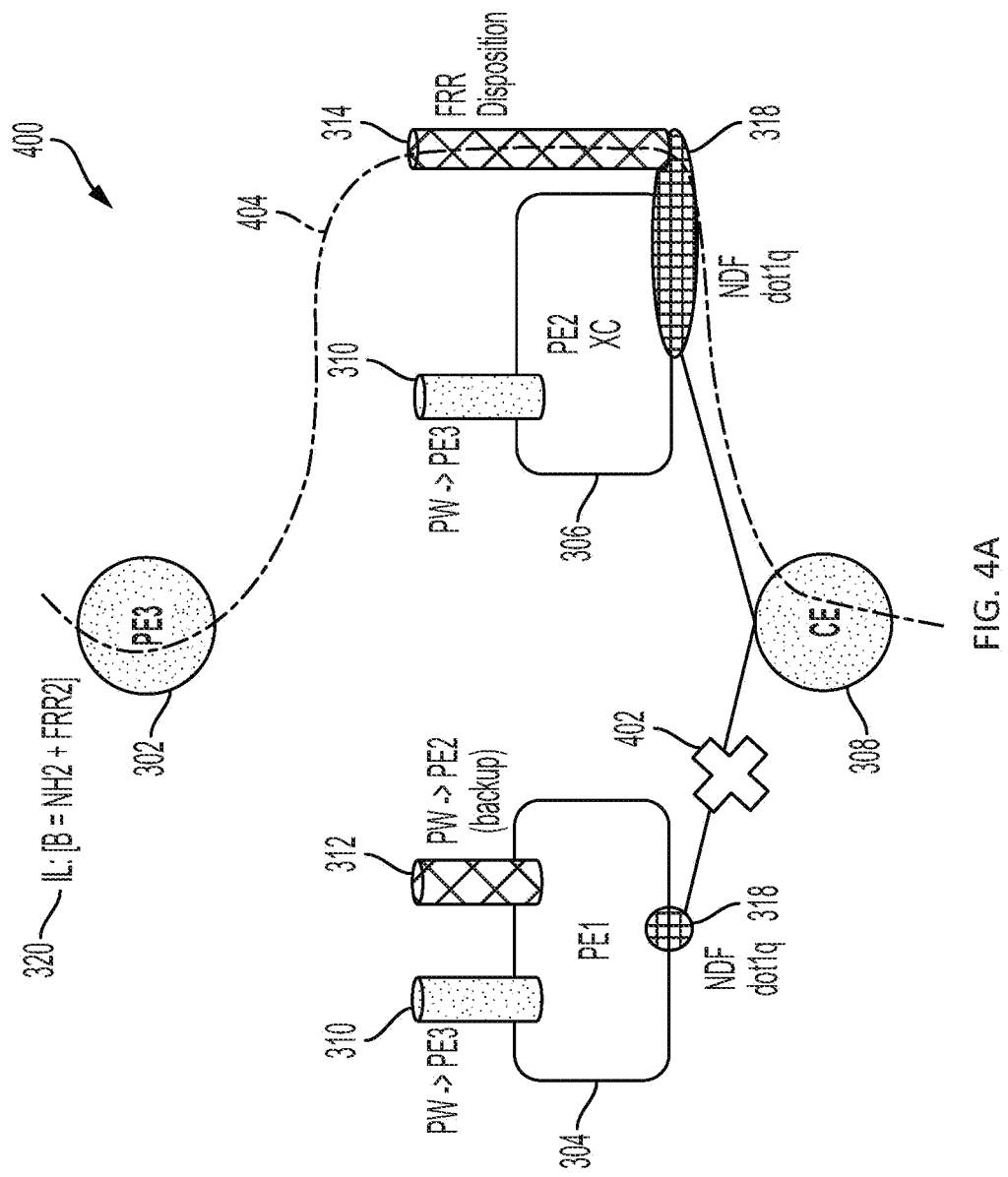
FIG. 4A illustrates a steady state single-active EVPN topology for internal removal at a provider edge (PE) node in accordance with some aspects of the disclosed technology.

FIG. 4A illustrates a steady-state single-active EVPN topology 400 for internal removal at a PE node in accordance with some aspects of the disclosed technology. In furtherance of FIG. 3, FIG. 4 depicts an example topology 400 that occurs in the event of a main-point failure 402 at PE1 304.

In some examples, upon detection of a main-point failure 402 of the primary route through PE1 304 programmed by the PE3 label 310, the backup EVI route as programmed by the PE2 label 312 is activated. Activating the EVI route programmed by the PE2 label results in the ingress traffic from PE3 302 being re-routed through the FRR Disposition 314 of PE2 306, as the NDF node 318. The in-flight traffic is subsequently transferred to the CE 308. The initial primary path to PE1 304 (shown in FIG. 3) is removed from the IL 320 due to the activation of the backup EVI route through PE2 306. As the ingress traffic for this service is directed to the backup route for PE2 306, the FRR label is encapsulated in place of the VPN label. PE2 306 then forwards the egress traffic through the FRR disposition path 314.

Figure 4B:
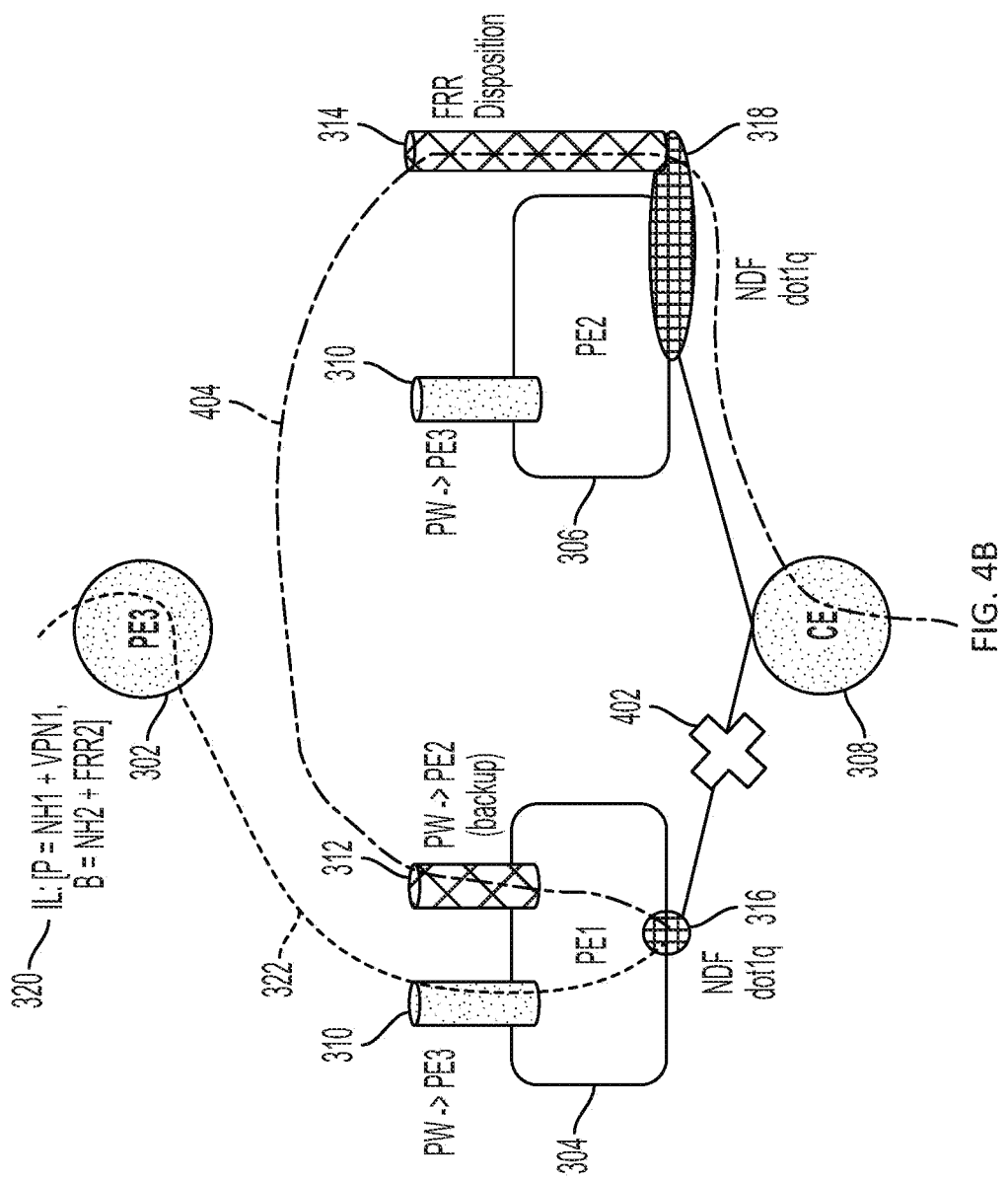
FIG. 4B illustrates a steady-state single-active EVPN topology 400 for in-flight traffic re-route upon detection of the main point failure, in accordance with some aspects of the disclosed technology.

FIG. 4B illustrates a steady-state single-active EVPN topology 400 for in-flight traffic re-route upon detection of the main point failure, in accordance with some aspects of the disclosed technology. Upon the detection of the main port failure, in-flight traffic from PE3 302 can be routed using a backup virtual circuit (VC) via PE1 to the FRR Disposition 314 path on PE2 306, which is used to bypass the DF election indicated as PE1 304 (in at least one example shown in FIG. 4B).

In some examples, in response to detecting the main-point failure 402 of the primary EVI route 322 as illustrated in FIG. 4A, PE1 304 can re-route the ingress traffic in accordance with the backup EVI route 404 using the backup virtual circuit. The DF node 316 can re-route the in-flight traffic received through the PE3 label 310 back through the PE2 label 312, which has programmed PE2 306 with the backup EVI route 404. As the in-flight traffic is routed along the backup EVI route 404, using the backup VC circuit via PE1 304 to the FRR Disposition 314 path on PE2 306, the DF election is bypassed. The NDF node 318 can then continue routing the in-flight traffic along the backup EVI route 404 to the CE 308.

Figure 5:
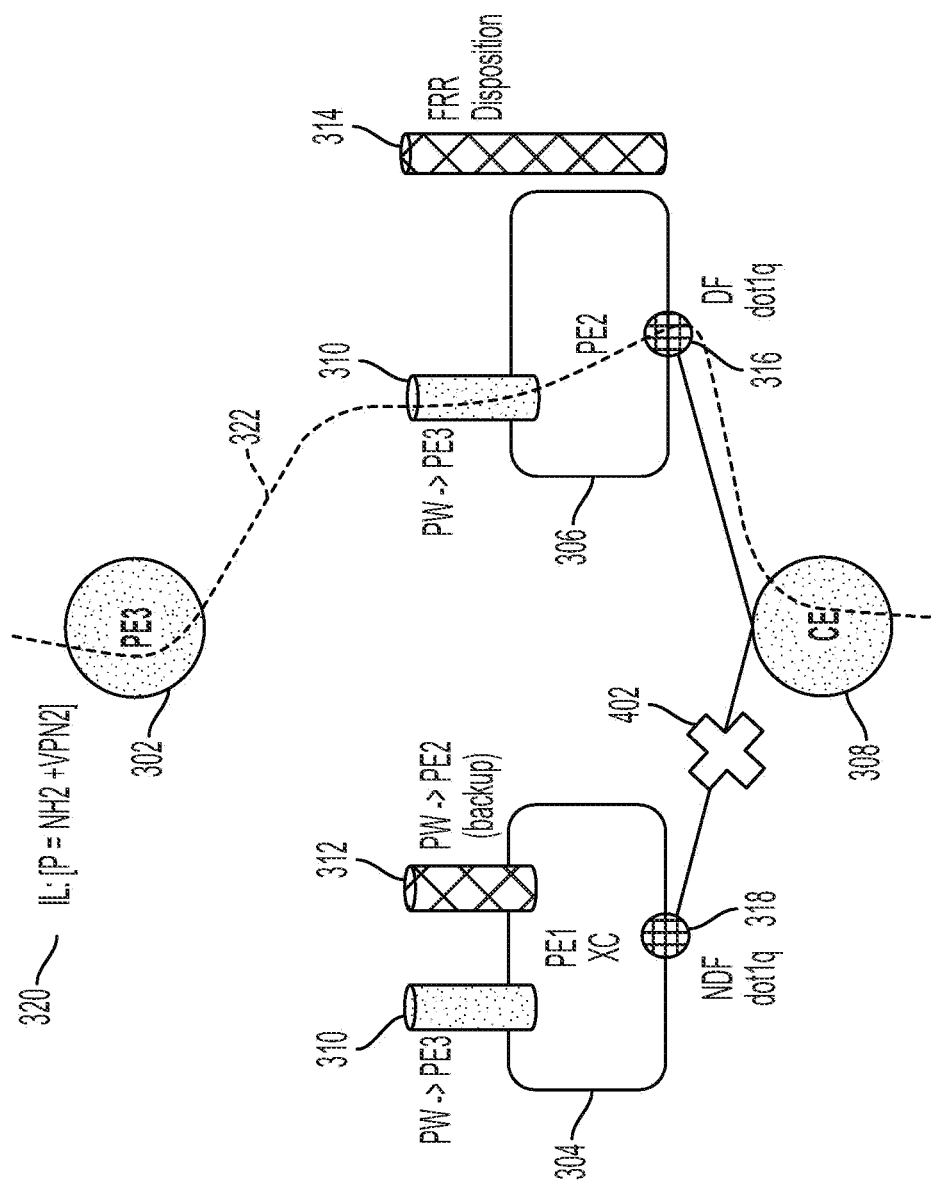
FIG. 5 illustrates a steady state single-active EVPN topology for completing a transition designated forwarder (DF) primary route in accordance with some aspects of the disclosed technology.

FIG. 5 illustrates a steady state single-active EVPN topology for completing a transition DF primary route in accordance with some aspects of the disclosed technology. Upon the completion of the DF primary route, the PE2 can become the DF node 316 and re-advertise or broadcast its EVI with a primary bit, indicating the EVI/EAD as the primary EVI route 322 for the ingress of traffic, along with a VPN label. PE3 302 can then re-program the imposition route using the correct VPN label, PE2 label 312, resulting in the resuming of the regular forwarding of the data traffic through PE2 306. The remote node PE3 302 can leverage the FRR Disposition 314 circuit while the control plane resolves the main-point failure 402, allowing the DF election to occur in order to mitigate traffic drop from an access main-port failure.

In some examples, the re-routing of the ingress of traffic through the PE2 306, due to the main-point failure 402, can be resolved due to the use of the pre-programmed FRR Disposition 314 path. The backup path programmed by the PE2 label 312 can be leveraged due to the initial advertising of PE2 306 as the backup EVPN service, as discussed above with relation to FIG. 3. The presence of a backup path installed at PE1 304, using the FRR PE2 label 312 from PE2, allows for a seamless transition between the primary path and the backup path to prevent a complete teardown of the imposition forwarding chain at PE3 302. This technique allows for there to be a reduction of traffic loss, and prevents the need for the PE2 label 312 to be installed directly at PE1 304. Once recovery is complete, and the DF election is finished, the EVI/EAD route can be re-advertised as the primary EVI route 322, and regular traffic forwarding will resume.

Implementation of EVPN virtual private wire service (VPWS) (EVPN-VPWS) can be accomplished by using a grouping mechanism in hardware to enable or disable traffic forwarding for all associated services. The grouping mechanism can also be leveraged to enable or disable the FRR path to a peering PE. In some examples, layer-2 behaviors can be recreated in a layer-3 portion of the forwarding chain by using behaviors that exist in the layer-3 portion, to allow for low-cost platforms to implement L2FRR behaviors at the cost of switchover performance.

Figure 6:
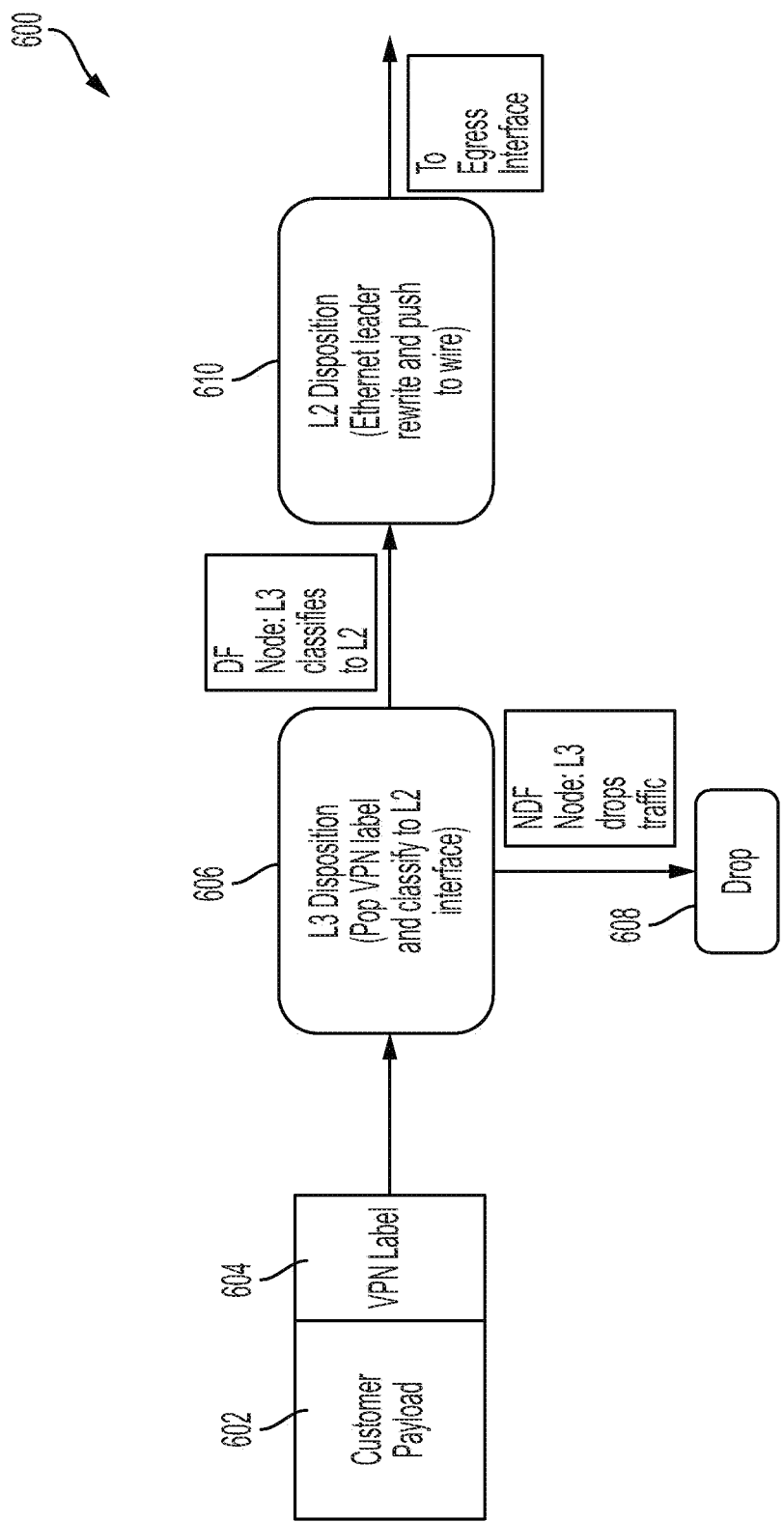
FIG. 6 illustrates an example topology of non-designated forwarder (NDF) blocking implemented using layer-3 (L3) forwarding in accordance with some aspects of the disclosed technology.

For single-active services, traffic can be block bi-directionally on the NDF node, as illustrated by FIG. 6, which illustrates an example communication of NDF blocking implemented using L3 forwarding in accordance with some aspects of the disclosed technology. For platforms that do not support a grouping mechanism that supports bi-directional block on the NDF node, an L3 disposition chain 600 can be programmed to drop traffic instead of performing the NDF drop in layer 2. As depicted in FIG. 3, data traffic including a customer payload 602 received, by an EVPN service from a remote node, can be forwarded to a CE based on a VPN label 604 that includes an FRR label indicating an EVI/EAD route. Upon the VPN label 604 indicating the corresponding EVI/EAD route for forwarding, the VPN label 604, upon receipt of the customer payload 602 can forward the customer payload 602 to the L3 disposition 606. The L3 disposition 606 can be programmed by the VPN label 604 to route the customer payload 602 through the DF node, where the L3 classifies to L2. Upon being classified to L2, the L2 disposition 610 can receive the customer payload for forwarding to an egress interface. Additionally, the L3 disposition 606 can be programmed by the VPN label 604 to drop 608 the customer payload 602.

Figure 7:
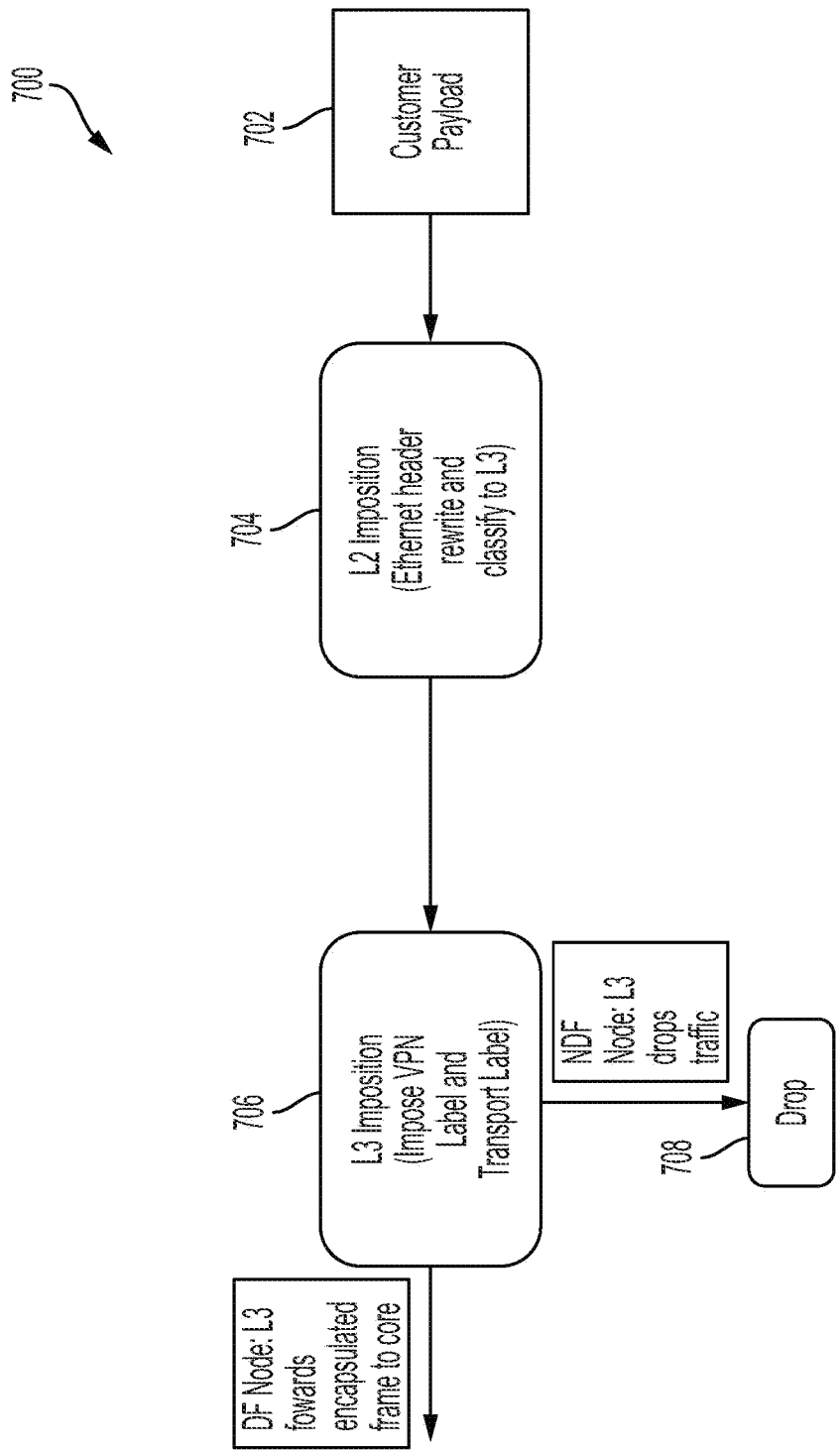
FIG. 7 illustrates another example topology of illustrates non-designated forwarder (NDF) blocking implemented using layer-3 (L3) forwarding in accordance with some aspects of the disclosed technology.

In some examples where a network requires strict bi-directional block of traffic for NDF nodes, the imposition chain can also be leveraged to block traffic until the node becomes the DF, resulting in traffic being blocked from the customer-facing access network. FIG. 7 illustrates another example topology 700 of illustrates non-designated forwarder (NDF) blocking implemented using L3 forwarding in accordance with some aspects of the disclosed technology.

The customer payload 702, represented as data traffic being forwarded to an L2 imposition 704, where the L2 imposition 704 associates an ethernet header to the customer payload 702. The ethernet header of the L2 imposition 704 is configured to rewrite and classify the customer payload from L2 to L3, resulting in the customer payload 702 being routed from the L2 imposition 704 to the L3 imposition 706 in accordance with the L3 reclassification by the L2 imposition 704. The L3 imposition 706 is configured to encapsulate the customer payload 702 and impose a VPN label including an FRR label, and a transport label. The L3 imposition can be programmed by the VPN label to forward the encapsulated customer payload 702 to the core network. The L3 imposition 706 can be programmed by the VPN label to drop 708 the customer payload 702.

Figure 8:
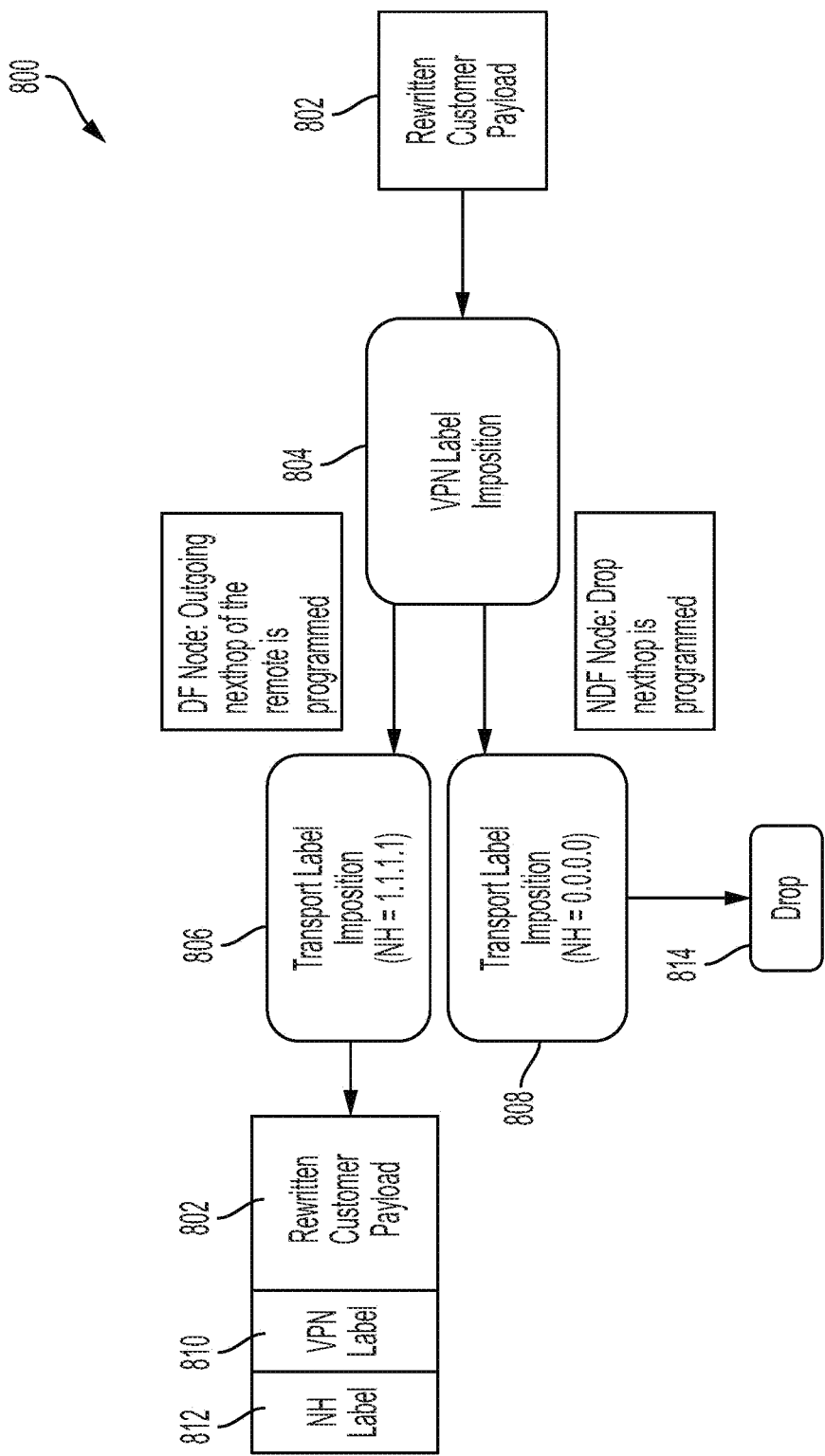
FIG. 8 illustrates an example topology of an L3 forwarding chain using drop nexthop in accordance with some aspects of the disclosed technology.

In some examples, the L3 imposition node can be implemented in multiple ways to balance resource utilization and convergence performance. A remote transport network can be replaced with a drop next hop. Accordingly, FIG. 8 illustrates an example topology of an L3 forwarding chain 800 using drop nexthop in accordance with some aspects of the disclosed technology.

In order to block traffic from the customer-facing access network, the imposition chain 800 can also be leveraged to block traffic until the node becomes the DF. The rewritten customer payload 802, upon being routed to the VPN label imposition 804 can be re-routed to either the first transport label imposition 806 or the second transport label imposition 808. The VPN label imposition 804 can be configured to route the rewritten customer payload 802 to the first transport label imposition 806, to program the first transport label imposition 806 with an outgoing next hop of the remote node. The first transport label imposition 806, based on the programmed next hop is configured to assign a VPN label 810, and a next hop (NH) label 812 to the rewritten customer payload 802. The VPN label imposition 804 is configured to route the rewritten customer payload 802 through the NDF node, to the second transport label imposition 808, to program the second transport label imposition 808 with a drop next hop of the remote node. Upon receipt of the programmed drop next hop, the second transport label imposition 808 is configured to drop 814 the rewritten customer payload 802.

Figure 9:
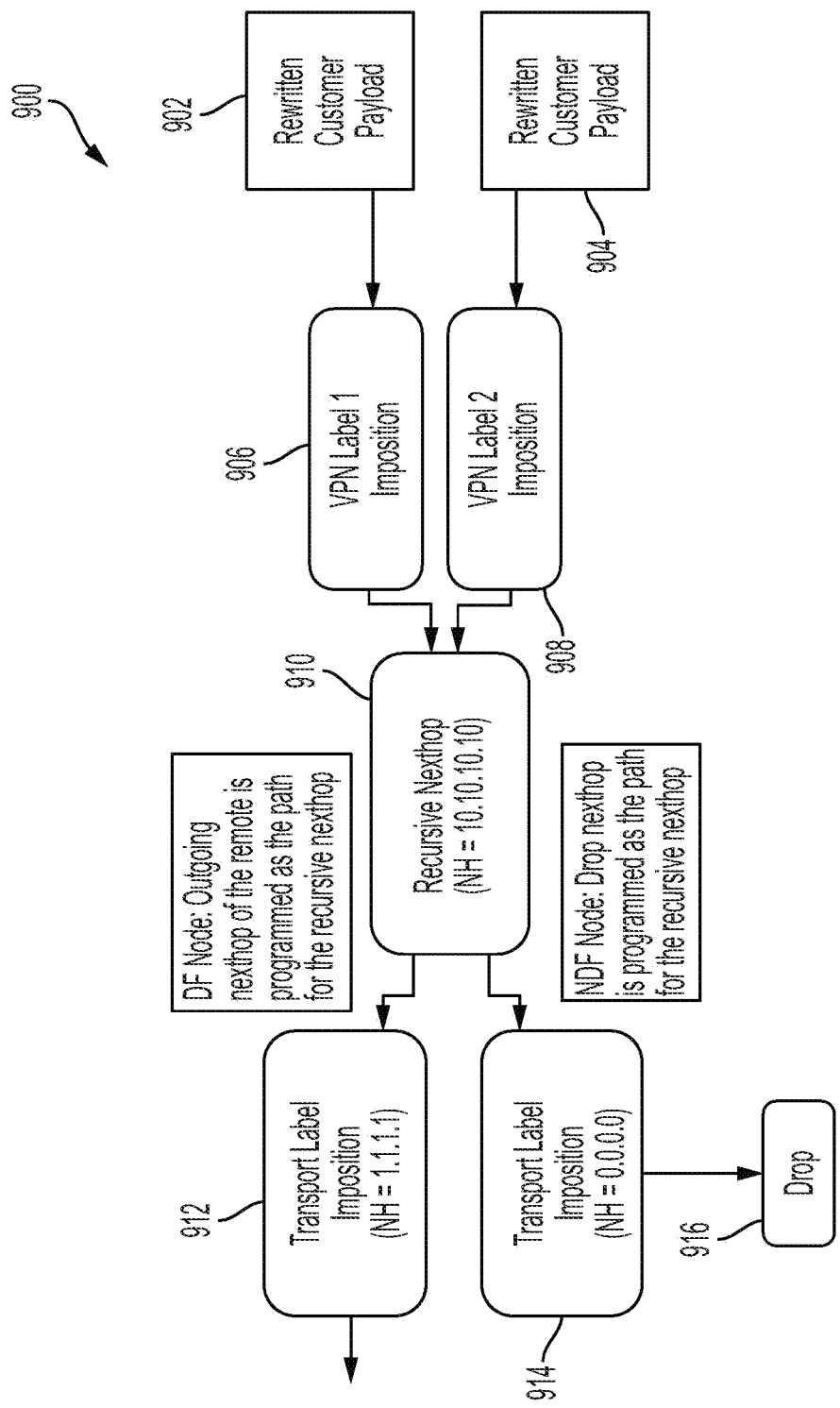
FIG. 9 illustrates an example topology of an L3 forwarding chain using recursive nexthop in accordance with some aspects of the disclosed technology.

FIG. 9 illustrates an example topology of an L3 forwarding chain 900 using recursive nexthopin accordance with some aspects of the disclosed technology. FIG. 9 depicts an example where an encapsulation object is utilized to allow for a single update to enable or disable a drop of traffic data without incurring the cost of an additional level of recursion. Accordingly, a first rewritten customer payload 902 and a second rewritten customer payload 904 can be routed to a first VPN label imposition 906 and a second VPN label imposition 908, respectively. The first VPN label imposition 906 and the second VPN label imposition 908 are configured to route the received first and second rewritten customer payloads 902, 904 to the recursive nexthop 910. The recursive nexthop 910 can route one or more of the first and second rewritten customer payloads 902, 904 through a DF node or a NDF node. The recursive nexthop 910 can program the first transport label imposition 912 with an outgoing nexthop of the remote node, as the path for the recursive nexthop 910 through the DF node. The first transport label imposition 912 can subsequently route the first rewritten customer payload 902 to an egress interface or a forwarding destination intended for the first or second rewritten customer payload 902. The recursive nexthop 910 can further program the second transport label imposition 914 with a drop next hop as the path for recursive nexthop 910. The second transport label imposition 914, in response to receiving the drop next hop, can drop 916, either the first or second rewritten customer payload 902, 904 received from the NDF node of the recursive nexthop 910.

Figure 10:
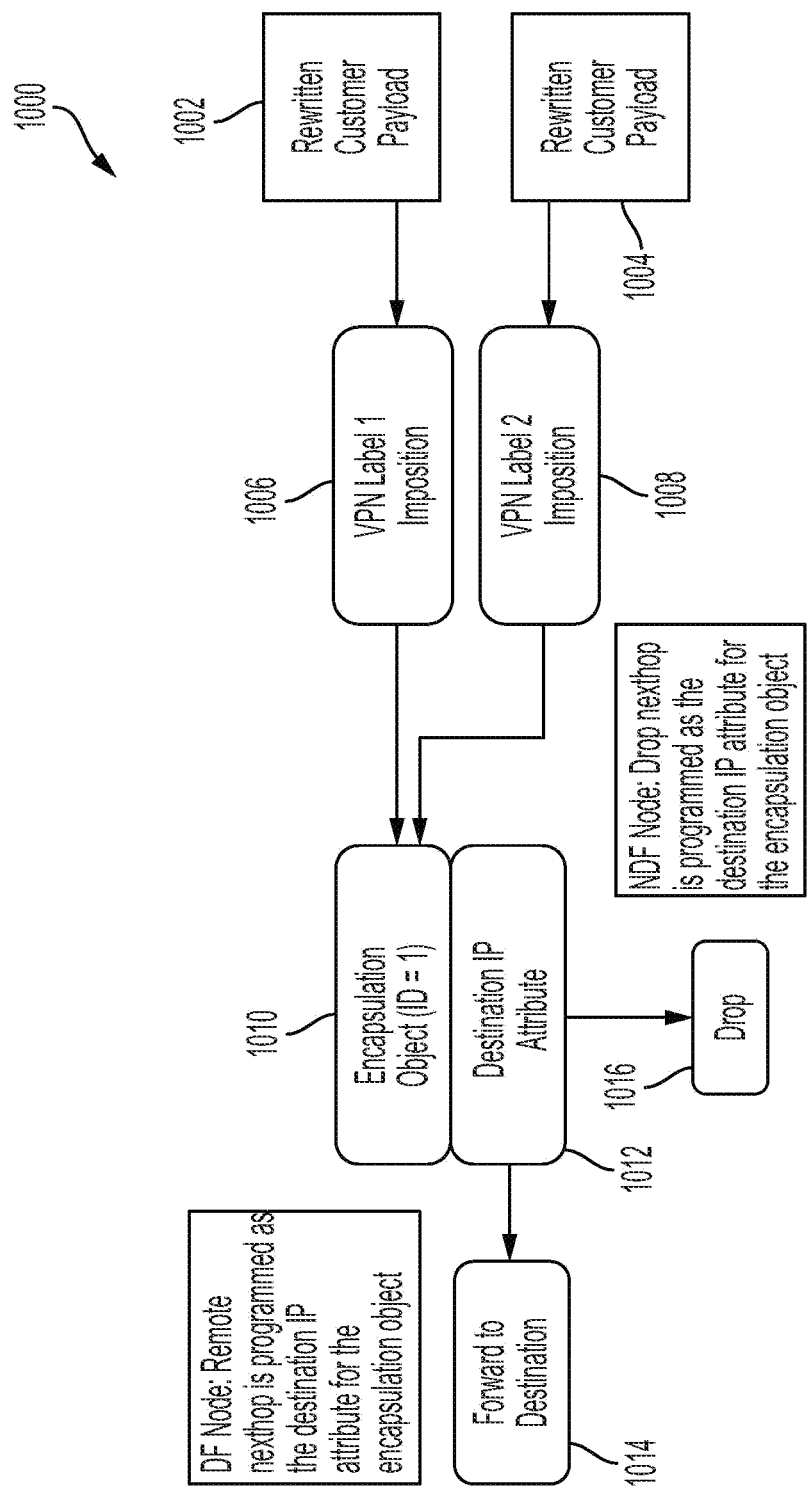

FIG. 10 illustrates an example topology of an L3 forwarding chain 1000 using an encapsulation object in accordance with some aspects of the disclosed technology. The L3 forwarding chain 1000, implemented as an L3 disposition chain, can redirect any in-flight traffic on the failed node. The redirect can be implemented by re-programming the chain from disposing to an L2 interface to recycling the packet back into the core with the FRR label of a peer. The first rewritten customer payload 1002 and the second rewritten customer payload 1004 each can be routed to a first VPN label imposition 1006 and a second VPN label imposition 1008, respectively. Each of the first and second VPN label impositions 1006, and 1008, can route the rewritten customer payload to an encapsulation object 1010. The encapsulation object 1010 can associate a destination IP attribute 1012 to each of the incoming first rewritten customer payload 1002 and the second rewritten customer payload 1004, to program an identified nexthop destination. In a first option, the DF node can program a remote nexthop as the destination IP attribute for the encapsulation object, to forward to destination 1014 the first or second rewritten customer payload 1002, 1004. In a second option, the NDF can program a drop nexthop as the destination IP attribute for the encapsulation object. Accordingly, the data traffic, including the first or second rewritten customer payload 1002, 1004 can be designated to drop 1016.

Figure 11:
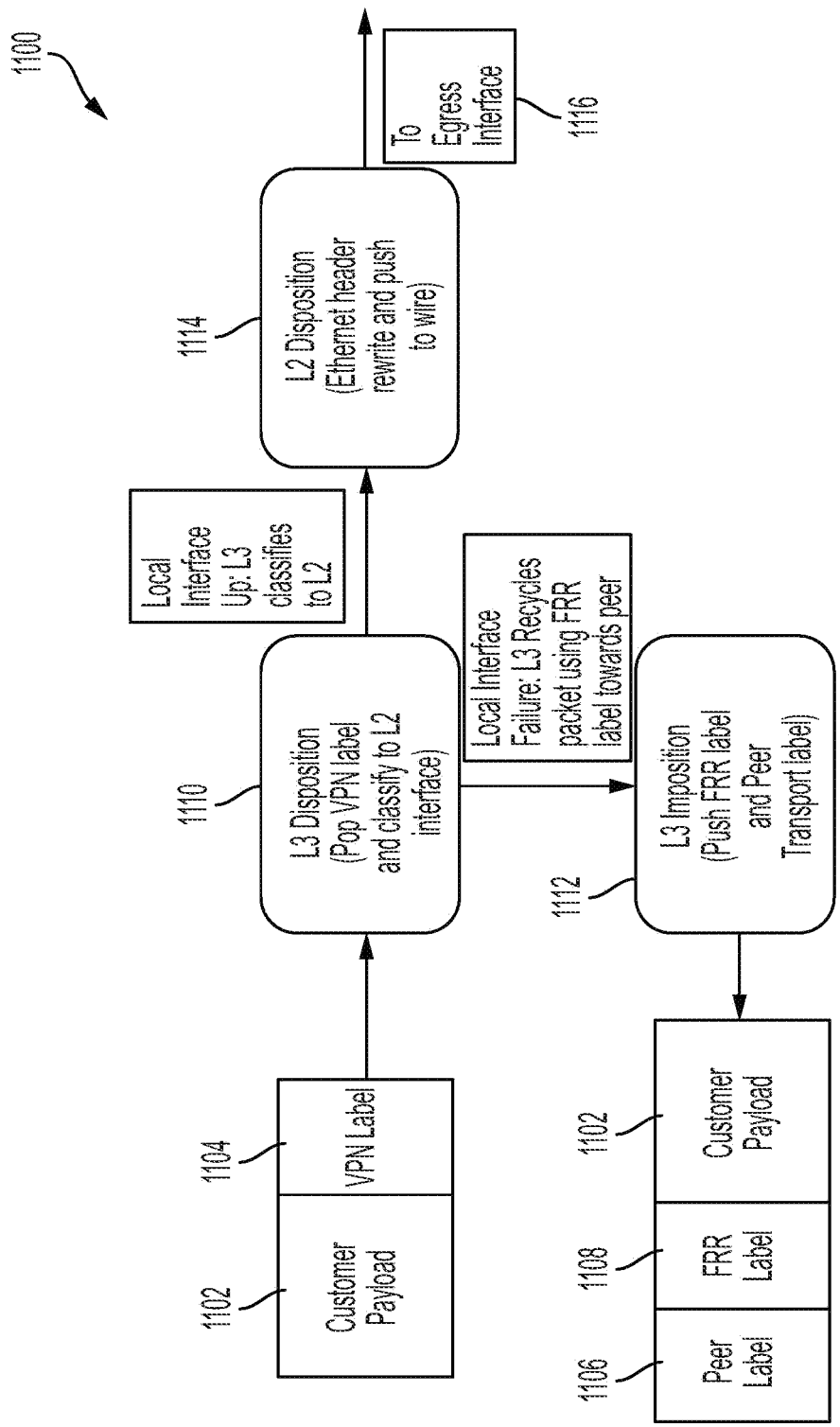
FIG. 11 illustrates FRR redirection topology implemented using L3 forwarding in accordance with some aspects of the disclosed technology.

In some examples, the EVPN FRR label can be extended beyond the peering PE, to mitigate traffic loss caused by the many transitional states and hardware programming delays that can occur while a network converges from a failed primary path to the backup path. Accordingly, FIG. 11 illustrates FRR redirection topology 1100 implemented using L3 forwarding in accordance with some aspects of the disclosed technology. The customer payload 1102, previously assigned a VPN label 1104 can be routed to the first L3 imposition 1112. The first L3 imposition 1112 can reclassify the customer payload 1102 to L2, and route the customer payload 1102 to the L2 disposition 1116. The L2 disposition 1116 can assign an ethernet header to the customer payload 1102 and route the customer payload 1102 to the egress interface 1118. Alternatively, upon detection of a local interface failure, the first L3 imposition 1112 can recycle an FRR label received from a peer EVPN service, and route the customer payload 1102 to the second L3 imposition 1114. The second L3 imposition 1114 can then assign the peer FRR label 1108, and the peer label 1106 to the customer payload 1102.

Figure 12:
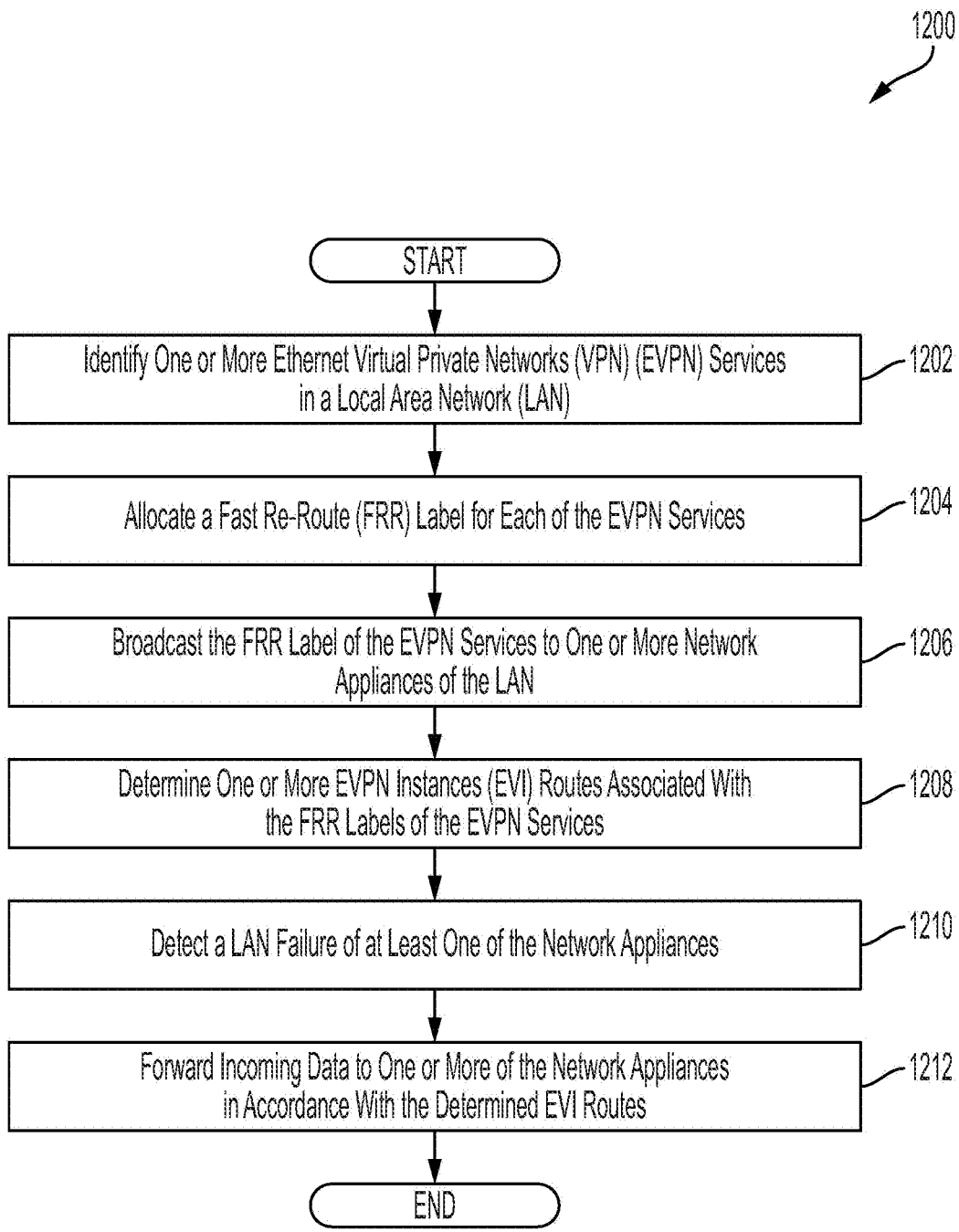
FIG. 12 illustrates an example method of forwarding data in response to a detected local area network (LAN) failure in accordance with some aspects of the disclosed technology.

FIG. 12 illustrates an example method 1200 of forwarding data in response to a detected local area network (LAN) failure. Although the example method 1200 depicts a particular sequence of operations, the sequence can be altered without departing from the scope of the present disclosure. For example, some of the operations depicted can be performed in parallel or in a different sequence that does not materially affect the function of the method 1200. In other examples, different components of an example device or system that implements the method 1200 can perform functions at substantially the same time or in a specific sequence.

According to some examples, the method includes identifying one or more ethernet virtual private networks (VPN) (EVPN) services in a local area network (LAN) at block 1202. For example, PE3 302, as the remote node, illustrated in FIG. 3 can identify one or more ethernet virtual private networks (VPN) (EVPN) services in a local area network (LAN).

According to some examples, the method 1200 includes allocating a fast re-route (FRR) label for each of the EVPN services at block 1204. For example, the remote node 302 illustrated in FIG. 3 can allocate a fast re-route (FRR) label for each EVPN services. In some examples, the FRR label can correspond to EVPN services functions and be configured with one or more attributes comprising a primary layer-2 (L2) attribute and a backup L2 attribute signaled with the determined EVI routes.

According to some examples, the method 1200 includes broadcasting the FRR label of the EVPN services to one or more network appliances of the LAN at block 1206. For example, an EVPN service, such as PE2 306 illustrated in FIG. 3 can broadcast the FRR label of the EVPN service to one or more network appliances of the LAN. Accordingly, the FRR labels can be broadcast to network appliances and EVPN services currently routing traffic along at least one of the EVI routes.

According to some examples, the method 1200 includes determining one or more EVPN instances (EVI) routes associated with the FRR labels of the EVPN services at block 1208. For example, one of the EVPN services with a pseudowire connection to the remote node PE3 302 illustrated in FIG. 3 can determine one or more EVPN instances (EVI) routes associated with the FRR labels of the EVPN services.

According to some examples, the method 1200 includes detecting a LAN failure of at least one of the network appliances at block 1210. For example, the EVPN service PE1 304 illustrated in FIG. 4 can detect a LAN failure 402 of at least one of the network appliances.

According to some examples, the method includes forwarding incoming data to one or more of the network appliances in accordance with the determined EVI routes at block 1212. For example, the NDF node 318 of the FRR Disposition 314 illustrated in FIG. 3 and FIG. 4 can forward incoming data to one or more of the network appliances in accordance with the determined EVI routes.

Further, the method comprises programming a primary EVI route for forwarding the incoming data to the one or more network appliances. For example, the PE3 label 310 illustrated in FIG. 3 can program a primary EVI route for forwarding the incoming data to the one or more network appliances. The primary route comprises an EVPN service comprising the FRR label including at least one of the EVI routes.

Further, the method comprises programming a backup EVI route for forwarding the incoming data to the one or more network appliances. For example, the PE2 label 312 illustrated in FIG. 3 can program a backup EVI route for forwarding the incoming data to the one or more network appliances. The backup route comprises an EVPN service comprising an updated FRR label including a next EVPN service to forward the incoming data. The backup EVI route is configured to replace a primary EVI route for forwarding the incoming data.

Further, the method comprises programming a backup EVI route for forwarding the incoming data to the one or more network appliances. For example, the PE2 label 312 illustrated in FIG. 3 can program a backup EVI route for forwarding the incoming data to the one or more network appliances.

Further, the method comprises receiving a designated forwarder (DF) election indicating one or more EVPN services configured to receive the incoming data upon detection of the LAN failure. For example, the PE1 304 illustrated in FIG. 3 can receive a designated forwarder (DF) election indicating one or more EVPN services configured to receive the incoming data upon detection of the LAN failure.

Further, the method comprises bypassing the one or more EVPN services comprising the DF election. For example, the NDF node 318 illustrated in FIG. 3 can bypass the one or more EVPN services comprising the DF election.

Further, the method comprises forwarding the incoming data to the one or more EVPN services comprising the FRR label. For example, the DF node 316 illustrated in FIG. 3 can forward the incoming data to the one or more EVPN services comprising the FRR label.

FIG. 13 shows an example of computing system 1300, which can be for example any computing device making up an EVPN service (PE1 304 or PE2 306), a CE 308, a remote node PE3 302 or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some examples computing system 1300 is a distributed system in which the functions described in this disclosure can be distributed within a datacenter, multiple datacenters, a peer network, etc. In some examples, one or more of the described system components represents many such components each performing some or all of the function for which the component is described. In some examples, the components can be physical or virtual devices.

Example system 1300 includes at least one processing unit (CPU or processor) 1310 and connection 1305 that couples various system components including system memory 1315, such as read only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 can essentially be a completely self-contained computing system, containing multiple cores or processors, a bus, memory controller, cache, etc. A multi-core processor can be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement and therefore the basic features here can easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1330 can include software services, servers, services, etc., that when the code that defines such software is executed by the processor 1310, it causes the system to perform a function. In some examples, a hardware service that performs a particular function can include the software component stored in a computer-readable medium in connection with the necessary hardware components, such as processor 1310, connection 1305, output device 1335, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory computer-readable medium.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

FIG. 14 illustrates an example network device 1400 suitable for performing switching, routing, load balancing, and other networking operations. The example network device 1400 can be implemented as switches, routers, nodes, metadata servers, load balancers, client devices, and so forth.

Network device 1400 includes a central processing unit (CPU) 1404, interfaces 1402, and a bus 1410 (e.g., a PCI bus). When acting under the control of appropriate software or firmware, the CPU 1404 is responsible for executing packet management, error detection, and/or routing functions. The CPU 1404 preferably accomplishes all these functions under the control of software including an operating system and any appropriate applications software. CPU 1404 can include one or more processors 1408, such as a processor from the INTEL X86 family of microprocessors. In some cases, processor 1408 can be specially designed hardware for controlling the operations of network device 1400. In some cases, a memory 1406 (e.g., non-volatile RAM, ROM, etc.) also forms part of CPU 1404. However, there are many different ways in which memory could be coupled to the system.

The interfaces 1402 are typically provided as modular interface cards (sometimes referred to as "line cards"). Generally, they control the sending and receiving of data packets over the network and sometimes support other peripherals used with the network device 1400. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces can include ports appropriate for communication with the appropriate media. In some cases, they can also include an independent processor and, in some instances, volatile RAM. The independent processors can control such communications intensive tasks as packet switching, media control, signal processing, crypto processing, and management. By providing separate processors for the communication intensive tasks, these interfaces allow the master CPU (e.g., 1404) to efficiently perform routing computations, network diagnostics, security functions, etc.

Although the system shown in FIG. 14 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1400.

Regardless of the network device's configuration, it can employ one or more memories or memory modules (including memory 1406) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc. Memory 1406 could also hold various software containers and virtualized execution environments and data.

The network device 1400 can also include an application-specific integrated circuit (ASIC), which can be configured to perform routing and/or switching operations. The ASIC can communicate with other components in the network device 1400 via the bus 1410, to exchange data and signals and coordinate various types of operations by the network device 1400, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory computer-readable medium.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method of forwarding data in response to a detected local area network (LAN) failure comprising: identifying one or more ethernet virtual private networks (VPN) (EVPN) services in a local area network (LAN); allocating one or more fast re-route (FRR) labels, wherein each of the FRR labels correspond to one or more functions of the EVPN services; broadcasting the FRR labels to a plurality of network appliances of the LAN; determining one or more EVPN instances (EVI) routes associated with the FRR labels; detecting a LAN failure of one of the plurality of the network appliances; and in response to detecting the LAN failure, forwarding incoming data to another one of the plurality of the network appliances in accordance with the determined EVI routes.

Aspect 2. The method of Aspect 1, further comprising: programming a primary EVI route for forwarding the incoming data to the one or more network appliances, wherein the primary EVI route comprises an EVPN service comprising a service label including at least one of the one or more EVI routes.

Aspect 3. The method of any of Aspects 1 to 2, further comprising: programming a backup EVI route for forwarding the incoming data to one of the plurality of network appliances, wherein the backup route comprises an EVPN service comprising an updated FRR label including a next EVPN service to forward the incoming data.

Aspect 4. The method of any of Aspects 1 to 3, further comprising: replacing a primary EVI route for forwarding the incoming data with the backup EVI route.

Aspect 5. The method of any of Aspects 1 to 4, wherein each of the FRR labels is configured with one or more attributes comprising a primary layer-2 (L2) attribute and a backup L2 attribute signaled with the determined EVI routes.

Aspect 6. The method of any of Aspects 1 to 5, further comprising: receiving a designated forwarder (DF) election indicating one or more EVPN services configured to receive the incoming data upon detection of the LAN failure; bypassing the one or more EVPN services comprising the DF election; and forwarding the incoming data to the one or more EVPN services comprising the FRR label.

Aspect 7. The method of any of Aspects 1 to 6, wherein the FRR labels are broadcast to network appliances and EVPN services currently routing traffic along at least one of the EVI routes.

Aspect 8. A network device for forwarding data in response to a detected local area network (LAN) failure includes a transceiver (in at least one example, a network interface, a wireless transceiver, etc.) and a processor coupled to the transceiver. The processor configured to execute instructions and cause the processor to: identify one or more ethernet virtual private networks (VPN) (EVPN) services in a local area network (LAN); allocate one or more fast re-route (FRR) labels, wherein each of the FRR labels correspond to one or more functions of the EVPN services; broadcast the FRR labels to a plurality of network appliances of the LAN; determine one or more EVPN instances (EVI) routes associated with the FRR labels; detect a LAN failure of one of the plurality of the network appliances; and in response to detecting the LAN failure, forward incoming data to another one of the plurality of the network appliances in accordance with the determined EVI routes.

Aspect 9. The network device of Aspect 8, wherein the processor is configured to execute the instructions and cause the processor to: program a primary EVI route for forwarding the incoming data to the one or more network appliances, wherein the primary EVI route comprises an EVPN service comprising a service label including at least one of the one or more EVI routes.

Aspect 10. The network device of any of Aspects 8 to 9, wherein the processor is configured to execute the instructions and cause the processor to: program a backup EVI route for forwarding the incoming data to one of the plurality of network appliances, wherein the backup route comprises an EVPN service comprising an updated FRR label including a next EVPN service to forward the incoming data.

Aspect 11. The network device of any of Aspects 8 to 10, wherein the processor is configured to execute the instructions and cause the processor to: replace a primary EVI route for forwarding the incoming data with the backup EVI route.

Aspect 12. The network device of any of Aspects 8 to 11, wherein each of the FRR labels is configured with one or more attributes comprising a primary layer-2 (L2) attribute and a backup L2 attribute signaled with the determined EVI routes.

Aspect 13. The network device of any of Aspects 8 to 12, wherein the processor is configured to execute the instructions and cause the processor to: receive a designated forwarder (DF) election indicating one or more EVPN services configured to receive the incoming data upon detection of the LAN failure; bypass the one or more EVPN services comprising the DF election; and forward the incoming data to the one or more EVPN services comprising the FRR label.

Aspect 14. The network device of any of Aspects 8 to 13, wherein the FRR labels are broadcast to network appliances and EVPN services currently routing traffic along at least one of the EVI routes.

Aspect 15. A computer readable medium comprising instructions using a computer system. The computer includes a memory (in at least one example, implemented in circuitry) and a processor (or multiple processors) coupled to the memory. The processor (or processors) is configured to execute the computer readable medium and cause the processor to: identify one or more ethernet virtual private networks (VPN) (EVPN) services in a local area network (LAN); allocate one or more fast re-route (FRR) labels, wherein each of the FRR labels correspond to one or more functions of the EVPN services; broadcast the FRR labels to a plurality of network appliances of the LAN; determine one or more EVPN instances (EVI) routes associated with the FRR labels; detect a LAN failure of one of the plurality of the network appliances; and in response to detecting the LAN failure, forward incoming data to another one of the plurality of the network appliances in accordance with the determined EVI routes.

Aspect 16. The computer readable medium of Aspect 15, wherein the processor is configured to execute the computer readable medium and cause the processor to: program a primary EVI route for forwarding the incoming data to the one or more network appliances, wherein the primary EVI route comprises an EVPN service comprising a service label including at least one of the one or more EVI routes.

Aspect 17. The computer readable medium of any of Aspects 15 to 16, wherein the processor is configured to execute the computer readable medium and cause the processor to: program a backup EVI route for forwarding the incoming data to one of the plurality of network appliances, wherein the backup route comprises an EVPN service comprising an updated FRR label including a next EVPN service to forward the incoming data.

Aspect 18. The computer readable medium of any of Aspects 15 to 17, wherein the processor is configured to execute the computer readable medium and cause the processor to: replace a primary EVI route for forwarding the incoming data with the backup EVI route.

Aspect 19. The computer readable medium of any of Aspects 15 to 18, wherein each of the FRR labels is configured with one or more attributes comprising a primary layer-2 (L2) attribute and a backup L2 attribute signaled with the determined EVI routes.

Aspect 20. The computer readable medium of any of Aspects 15 to 19, wherein the processor is configured to execute the computer readable medium and cause the processor to: receive a designated forwarder (DF) election indicating one or more EVPN services configured to receive the incoming data upon detection of the LAN failure; bypass the one or more EVPN services comprising the DF election; and forward the incoming data to the one or more EVPN services comprising the FRR label.

Aspect 21. The computer readable medium of any of Aspects 15 to 20, wherein the FRR labels are broadcast to network appliances and EVPN services currently routing traffic along at least one of the EVI routes.

What is claimed is:

1. A method of forwarding data in response to a detected local area network (LAN) failure comprising:
identifying one or more ethernet virtual private networks (VPN) (EVPN) services in a local area network (LAN), including at least a first service and a second service;
allocating one or more fast re-route (FRR) labels wherein each of the FRR labels correspond to one or more functions of the EVPN services;
broadcasting the FRR labels to a plurality of network appliances of the LAN;
determining one or more EVPN instances (EVI)-ethernet auto discovery route (EAD) (EVI-EAD) routes associated with the FRR labels, wherein a first label corresponds to the first service with a route to one of the plurality of the network appliances and a second label corresponds to the second service with a route to the one of the plurality of the network appliances;
detecting a LAN failure between the first service and the one of the plurality of the network appliances; and
in response to detecting the LAN failure, for incoming data not in-flight, activating the route programmed for the second label to forward the incoming data through an FRR disposition at the second service to the one of the plurality of the network appliances and for in-flight traffic, re-rerouting the in-flight traffic through the second label as a back-up route through the FRR disposition at the second service to the one of the plurality of the network appliances.

2. The method of claim 1, further comprising:
transmitting a primary EVI-EAD route for forwarding the incoming data to the one or more network appliances, wherein the primary EVI-EAD route comprises an EVPN service comprising a service label including at least one of the one or more EVI-EAD routes.

3. The method of claim 1, further comprising:
transmitting a backup EVI-EAD route for forwarding the incoming data to one of the plurality of network appliances, wherein the backup route comprises an EVPN service comprising an updated FRR label including a next EVPN service to forward the incoming data.

4. The method of claim 3, further comprising:
replacing a primary EVI-EAD route for forwarding the incoming data with the backup EVI-EAD route.

5. The method of claim 1, wherein each of the FRR labels is configured with one or more attributes comprising a primary layer-2 (L2) attribute and a backup L2 attribute signaled with the determined EVI-EAD routes.

6. The method of claim 1, further comprising:
receiving a designated forwarder (DF) election indicating one or more EVPN services configured to receive the incoming data upon detection of the LAN failure;
bypassing the one or more EVPN services comprising the DF election; and forwarding the incoming data to the one or more EVPN services comprising the FRR label.

7. The method of claim 1, wherein the FRR labels are broadcast to network appliances and EVPN services currently routing traffic along at least one of the EVI-EAD routes.

8. A network device comprising:
a transceiver;
a processor configured to execute instructions, the instructions operable to cause the processor to:
identify one or more ethernet virtual private networks (VPN) (EVPN) services in a local area network (LAN), including at least a first service and a second service;
allocate one or more fast re-route (FRR) labels, wherein each of the FRR labels correspond to one or more functions of the EVPN services;
broadcast the FRR labels to a plurality of network appliances of the LAN;
determine one or more EVPN instances (EVI)-ethernet auto discovery (EAD) (EVI-EAD) routes associated with the FRR labels, wherein a first label corresponds to the first service with a route to one of the plurality of the network appliances and a second label corresponds to the second service with a route to the one of the plurality of the network appliances;
detect a LAN failure between the first service and the one of the plurality of the network appliances; and in response to detecting the LAN failure, for incoming data not in-flight, activate the route programmed for the second label to forward the incoming data through an FRR disposition at the second service to the one of the plurality of the network appliances and for in-flight traffic, re-rerouting the in-flight traffic through the second label as a back-up route through the FRR disposition at the second service to the one of the plurality of the network appliances.

9. The network device of claim 8, wherein the instructions further cause the processor to:
transmit a primary EVI-EAD route for forwarding the incoming data to the one or more network appliances, wherein the primary EVI-EAD route comprises an EVPN service comprising a service label including at least one of the one or more EVI-EAD routes.

10. The network device of claim 8, wherein the instructions further cause the processor to:
transmit a backup EVI-EAD route for forwarding the incoming data to one of the plurality of network appliances, wherein the backup route comprises an EVPN service comprising an updated FRR label including a next EVPN service to forward the incoming data.

11. The network device of claim 10, wherein the instructions further cause the processor to:
replace a primary EVI-EAD route for forwarding the incoming data with the backup EVI-EAD route.

12. The network device of claim 8, wherein each of the FRR labels is configured with one or more attributes comprising a primary layer-2 (L2) attribute and a backup L2 attribute signaled with the determined EVI-EAD routes.

13. The network device of claim 8, wherein the instructions further cause the processor to:
receive a designated forwarder (DF) election indicating one or more EVPN services configured to receive the incoming data upon detection of the LAN failure;
bypass the one or more EVPN services comprising the DF election; and
forward the incoming data to the one or more EVPN services comprising the FRR label.

14. The network device of claim 8, wherein the FRR labels are broadcast to network appliances and EVPN services currently routing traffic along at least one o the EVI EAD routes.

15. A non-transitory computer readable medium comprising instructions, the instructions, when executed by a computing system, cause the computing system to:
identify one or more ethernet virtual private networks (VPN) (EVPN) services in a local area network (LAN), including at least a first service and a second service;
allocate one or more fast re-route (FRR) labels, wherein each of the FRR labels correspond to one or more functions of the EVPN services;
broadcast the FRR labels to a plurality of network appliances of the LAN;
determine one or more EVPN instances (EVI)-ethernet auto discovery route (EAD) (EVI-EAD) routes associated with the FRR labels, wherein a first label corresponds to the first service with a route to one of the plurality of the network appliances and a second label corresponds to the second service with a route to the one of the plurality of the network appliances;
detect a LAN failure between the first service and the of one of the plurality of the network appliances; and
in response to detecting the LAN failure, incoming data not in-flight, activating the route programmed for the second label to forward the incoming data through an FRR disposition at the second service to the one of the plurality of the network appliances and for in-flight traffic, re-rerouting the in-flight traffic through the second label as a back-up route through the FRR disposition at the second service to the one of the plurality of the network appliances.

16. The computer readable medium of claim 15, wherein the computer readable medium further comprises instructions that, when executed by the computing system, cause the computing system to:
transmit a primary EVI-EAD route for forwarding the incoming data to the one or more network appliances, wherein the primary EVI-EAD route comprises an EVPN service comprising a service label including at least one of the one or more EVI-EAD routes.

17. The computer readable medium of claim 15, wherein the computer readable medium further comprises instructions that, when executed by the computing system, cause the computing system to:
transmit a backup EVI-EAD route for forwarding the incoming data to one of the plurality of network appliances, wherein the backup route comprises an EVPN service comprising an updated FRR label including a next EVPN service to forward the incoming data.

18. The computer readable medium of claim 17, wherein the computer readable medium further comprises instructions that, when executed by the computing system, cause the computing system to:
replace a primary EVI-EAD route for forwarding the incoming data with the backup EVI-EAD route.

19. The computer readable medium of claim 15, wherein each of the FRR labels is configured with one or more attributes comprising a primary layer-2 (L2) attribute and a backup L2 attribute signaled with the determined EVI-EAD routes.

20. The computer readable medium of claim 15, wherein the computer readable medium further comprises instructions that, when executed by the computing system, cause the computing system to:
receive a designated forwarder (DF) election indicating one or more EVPN services configured to receive the incoming data upon detection of the LAN failure;
bypass the one or more EVPN services comprising the DF election; and
forward the incoming data to the one or more EVPN services comprising the FRR label.

* * * * *